United States Patent [19]

Stone

[11] Patent Number: 5,612,788
[45] Date of Patent: Mar. 18, 1997

[54] VIDEO DATA COMPRESSION APPARATUS FOR RECORDING AND REPRODUCING COMPRESSED VIDEO DATA AT THEIR VARIOUS COMPRESSED DATA RATES

[75] Inventor: Jonathan J. Stone, Reading, United Kingdom

[73] Assignees: Sony Corporation, Tokyo, Japan; Sony United Kingdom Limited, Weybridge, England

[21] Appl. No.: 245,563

[22] Filed: May 18, 1994

[30] Foreign Application Priority Data

Jul. 30, 1993 [GB] United Kingdom ............. 9315857

[51] Int. Cl.[6] .............. H04N 5/76; H04N 5/92; H04N 5/95
[52] U.S. Cl. .............. 386/85; 386/109; 386/112
[58] Field of Search ................ 348/207, 405, 348/415, 714, 715, 716, 717, 718, 719; 358/310, 335, 342, 906, 909.1, 320, 337, 339; 360/33.1, 9.1; H04N 5/76, 5/78, 5/92, 5/95, 9/89

[56] References Cited

U.S. PATENT DOCUMENTS

| 5,032,927 | 7/1991 | Watanabe et al. | 358/335 |
| 5,124,814 | 6/1992 | Takahashi et al. | 358/335 |
| 5,291,282 | 3/1994 | Nakagawa et al. | 348/415 |
| 5,337,087 | 8/1994 | Mishima | 348/405 |

*Primary Examiner*—Thai Q. Tran
*Attorney, Agent, or Firm*—William S. Frommer; Alvin Sinderbrand

[57] ABSTRACT

Apparatus for recording and reproducing video data is described that utilizes data compression to increase storage capacity. Real time input video data is decorrelated, quantized and entropy encoded. User control of a compression control parameter, such as quantization step width, is provided so that the user can adjust the loss of fidelity through compression to a desired level. The compressed data is output to a storage RAM 38 at an unregulated varying data rate. The system allows real time storage of video data in a manner in which the loss of fidelity is held constant and the amount of storage capacity required for particular sections of input video data varies with the information content of that input video data.

16 Claims, 3 Drawing Sheets

5,612,788

VIDEO DATA COMPRESSION APPARATUS FOR RECORDING AND REPRODUCING COMPRESSED VIDEO DATA AT THEIR VARIOUS COMPRESSED DATA RATES

BACKGROUND OF THE INVENTION

1. Field of the Invention

This invention relates to video data compression. More particular, this invention relates to the real time recording of video data as compressed video data.

2. Description of the Prior Art

Data compression is utilised in the still image field. The proposed JPEG standard provides a non real time image data compression technique for use in situations such as the compression of still images by and for storage within general purpose computers. The JPEG technique utilises quantization as One step in the compression process. The quantization step width applied may be changed to change the degree of compression achieved. Using a Small quantization step width will increase the length of time needed to encode the data (limited rate data channels within a computer) and the amount of storage space needed to store the compressed image. Conversely, using a large quantization step width will decrease the length of time needed to encode the data and the amount of storage space needed to store the compressed image. The asynchronous, non real time nature of the JPEG approach means that such variation is not an issue of importance.

It is also known to utilise real time compression systems in conjunction with storage applications in order to increase the storage capacity. A requirement in such systems is the achieving of a constant output bit rate compatible with the storage medium used. This approach results in a variable picture quality depending upon the image information content. Furthermore, since these systems have to achieve an acceptable picture quality with the most difficult of images, they produce an image quality in excess of that genuinely required for the majority of pictures with a consequential reduction in storage capacity.

The constant data rate approach is imposed on convention compression systems due to the nature of the storage media that are generally used. In particular, storage media such as magnetic tapes, hard-discs and magneto optic discs have mechanical inertia such that they are only able to deal with a constant data rate when operating close to their peak performance. Thus, for images with a small amount of information content, the image quality exceeds the specification (and is likely to be lossless) and for images with a large amount of information, the image quality can be below specification.

SUMMARY OF THE INVENTION

Viewed from one aspect this invention provides apparatus for real time recording constant rate uncompressed video data, said apparatus comprising:

(i) means for compressing said uncompressed video data to form compressed video data at a varying compressed data rate, said varying compressed data rate being unregulated and dependent upon a compression control parameter, which controls loss of fidelity through compression, and suitability of said uncompressed video data for compression;

(ii) means for user adjustment of said compression control parameter; and (iii) means for storing said compressed video data at said varying compressed data rate;

whereby, in use, a user may adjust said compression control parameter to balance loss of fidelity against maximum recording capacity for particular uncompressed video data.

The invention moves against the trend in the field by recognising that significant advantages can be achieved if the compressed data rate is allowed to vary, i.e. the compressed data rate is unregulated and will vary as the input video data changes from images of high information content to images of low information content and vice versa. A requirement for this new approach is that the storage medium used be capable of accepting such variable rate compressed data.

In operation, the user is able to adjust the compression control parameter to control the loss of fidelity through the compression system, i.e. in a post-production system where absolute image quality is vital, then very little loss of fidelity will be tolerated and the compressed data rate will be high, whereas in a situation, such as television sports broadcasting in which an instant replay is required, absolute image fidelity is not so important and this can be traded against an increase in storage capacity due to a lower compressed data rate.

The principle of the invention can be thought of as allowing the user to select the amount of loss of fidelity they are prepared to accept during the compression process, this being held constant and the degree of compression achieved varying in dependence upon whether high information content or low information content images are being compressed. In contrast to this new approach, the previous approach was to maintain a constant degree of compression irrespective of the information content of the image concerned with a consequential variation in image quality that is often highly noticeable and visually disturbing.

As mentioned above, the means for storing the compressed video data must be able to handle the varying compressed data rate. One possibility would be to use a storage medium operating significantly below its maximum data rate such that it is able to cope with the synchronisation and other problems associated with varying data rate. In this case, the storage medium could be chosen from amongst the conventional media such as magneto optic discs, hard-discs and magnetic tapes. As the maximum data rates that can be handled by such technology steadily increase, their use in this circumstance becomes increasingly easy. This is particularly true of magnetic disc storage, that has the advantages of ready availability and steadily increasing performance. In addition, it will be recognised that as the data rates associated with image data are typically very high, a storage medium inherently able to deal with varying data rates without difficulty will be a significant advantage. Accordingly, random access memory is particularly suitable for use as the means for storing in the present invention.

In the case of the use of random access memory, it is convenient to control the storage by using a write controller for generating an periodic write control signal for triggering storage of a byte of compressed video data in said random access memory when said byte is output by said means for compressing and for incrementing a write address of said random access memory along a predetermined sequence.

It will be appreciated that the compression control parameter could take a number of forms. For example, an image could be compressed in manner in which the high spatial frequency information was ignored so as to achieve a higher degree of compression. In this case, the amount of high spatial frequency information removed can be adjusted using a control parameter acting upon an appropriate filter.

However, in particularly preferred embodiments of the invention it is advantageous that said means for compressing comprises a quantizer and said compression control parameter is quantization step width.

The use of a quantizer with a variable quantization step width allows almost direct control over the loss of fidelity.

Preferred compression systems also utilise a frequency separator for transforming the video data into the spatial frequency domain and an entropy encoder, such as a runlength and Huffman coder.

A complementary aspect of the apparatus for recording the compressed video data is that it should be provided with means for reproducing the video data. Accordingly, preferred embodiments have means for real time reproducing said uncompressed video data at said constant uncompressed data rate from said compressed video data, said means for real time reproducing comprising:

(i) means for reading said compressed data from said means for storing at said varying compressed data rate; and (ii) means for decompressing said compressed video data at said varying compressed data rate to form said uncompressed video data at said constant uncompressed data rate, said means for decompressing being controlled by said compression control parameter stored in association with said compressed data.

The reproducing arm of the device advantageously includes a read controller for generating an periodic read control signal for triggering reading of a byte of compressed video data from said random access memory when said means for decompressing is ready for a next a byte of compressed video data and for incrementing a read address of said random access memory along said predetermined sequence. This corresponds to the write controller on the recording side.

The reproducing arm also will include a complementary dequantizer, frequency combiner and entropy decoder.

Viewed from another aspect this invention provides a method of real time recording constant rate uncompressed video data, said method comprising the steps of:

(i) compressing said uncompressed video data to form compressed video data at a varying compressed data rate, said varying compressed data rate being unregulated and dependent upon a compression control parameter which controls loss of fidelity through compression, and suitability of said uncompressed video data for compression;

(ii) adjusting said compression control parameter in response to user inputs; and (iii) storing said compressed video data at said varying compressed data rate;

whereby, in use, a user may adjust said compression control parameter to balance loss of fidelity against maximum recording capacity for particular uncompressed video data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
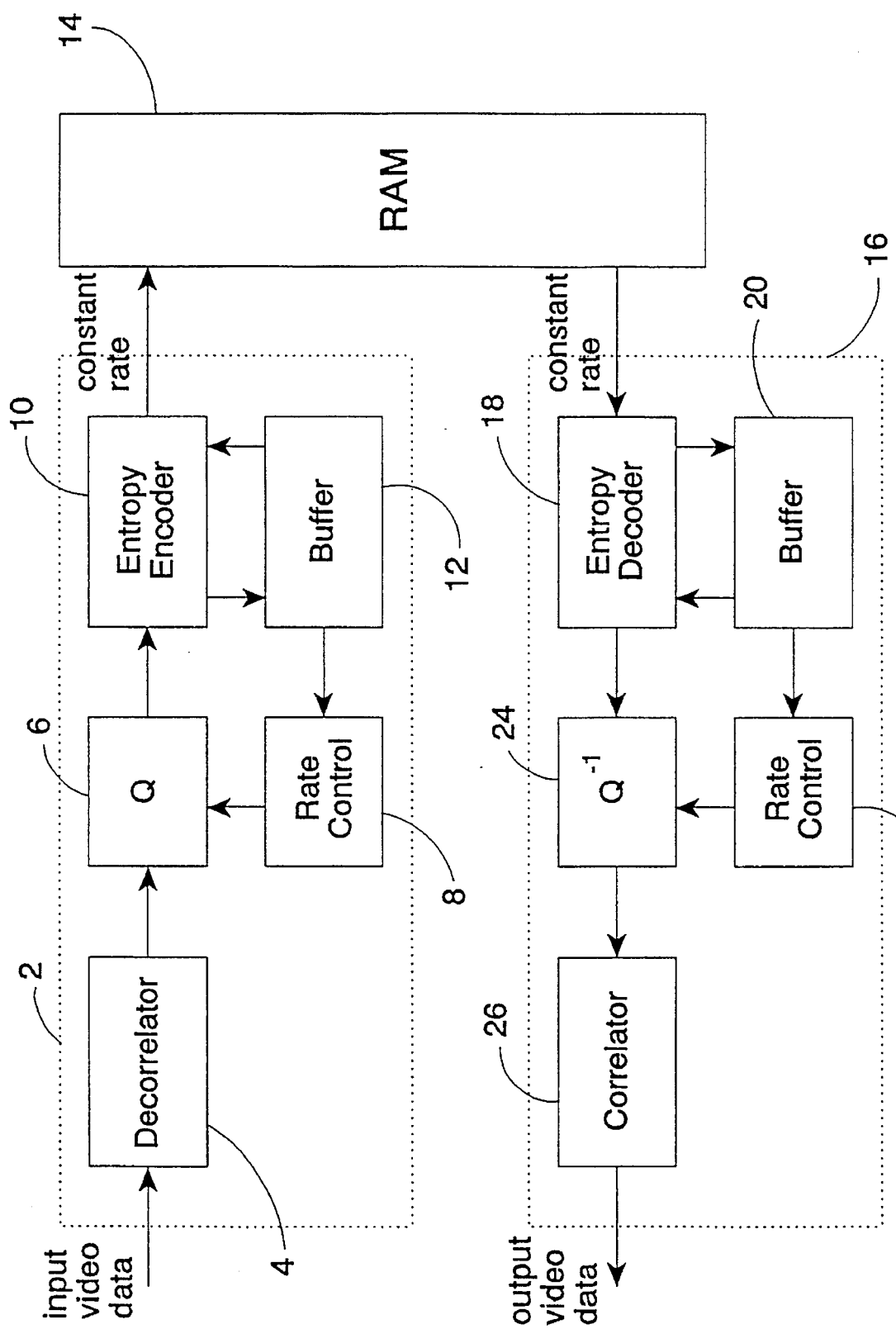
FIG. 1 illustrates a conventional video data recording and reproducing apparatus.

FIG. 1 illustrates video data recording and reproducing apparatus utilising data compression. Video data is input to a compression apparatus 2 where it is first received in a decorrelator The decorrelator 4 applies a spatial frequency separation technique, such as wavelet coding, sub band coding or DCT coding. The output of the decorrelator 4 passes to a quantizer 6.

The quantizer 6 applies quantization according to a given quantization step width to the decorrelated data in order to reduce the information content thereof. The quantization step width may vary between differing frequency components of the decorrelated data in accordance with their corresponding importance to the ultimate perceived image quality. On an overall level, the mean quantization step width applied is adjusted by a rate controller 8. Applying more severe quantization will reduce the information content of the data and allow a higher degree of compression compared with applying a less severe quantization. The output from the quantizer 6 passes to an entropy encoder 10.

The entropy encoder 10 performs runlength coding and then Huffman coding in accordance with known techniques. An inherent characteristic of such encoding techniques is that they result in an output data rate which is dependent, among other things, upon the suitability of the image for compression. The output from the entropy encoder 10 is the compressed data stream. This compressed data stream is regulated to have a constant compressed data rate by a feedback action imposed by a buffer 12 and the rate controller 8.

The buffer 12 receives the compressed data from the entropy encoder 10 before passing it to a random access memory 14 (the buffer effectively smooths the data rate). The buffer 12 generates a control signal serving to perform negative feedback that is applied to the rate controller 8 such that if the buffer 12 becomes too full, then the quantization step width is increased and if the buffer 12 becomes too empty then the quantization step width is decreased. The data output from the buffer 12 to the RAM 14 is is at a constant regulated compressed data rate.

The data stored within the RAM 14 may subsequently be read out and decompressed by a decompression system 16. The compressed data is read out from the RAM 14 at a constant rate and passed to an entropy decoder 18 where inverse Huffman coding and inverse runlength coding are applied. The constant rate data From the RAM 14 passes to the entropy decoder 18 via a buffer 20. The amount of free space within the buffer 20 is passed to a rate controller 22 which uses this to determine a quantization step width to be applied by a dequantizer 24 that receives the output of the entropy decoder 18. The symmetry of the system is such that the step width applied by the dequantizer 24 will follow that originally applied by the quantizer 6.

The output from the dequantizer 24 passes to a correlator 26 where the delta is transformed from the spatial frequency domain to the spatial domain and output as constant rate video data.

Figure 2:
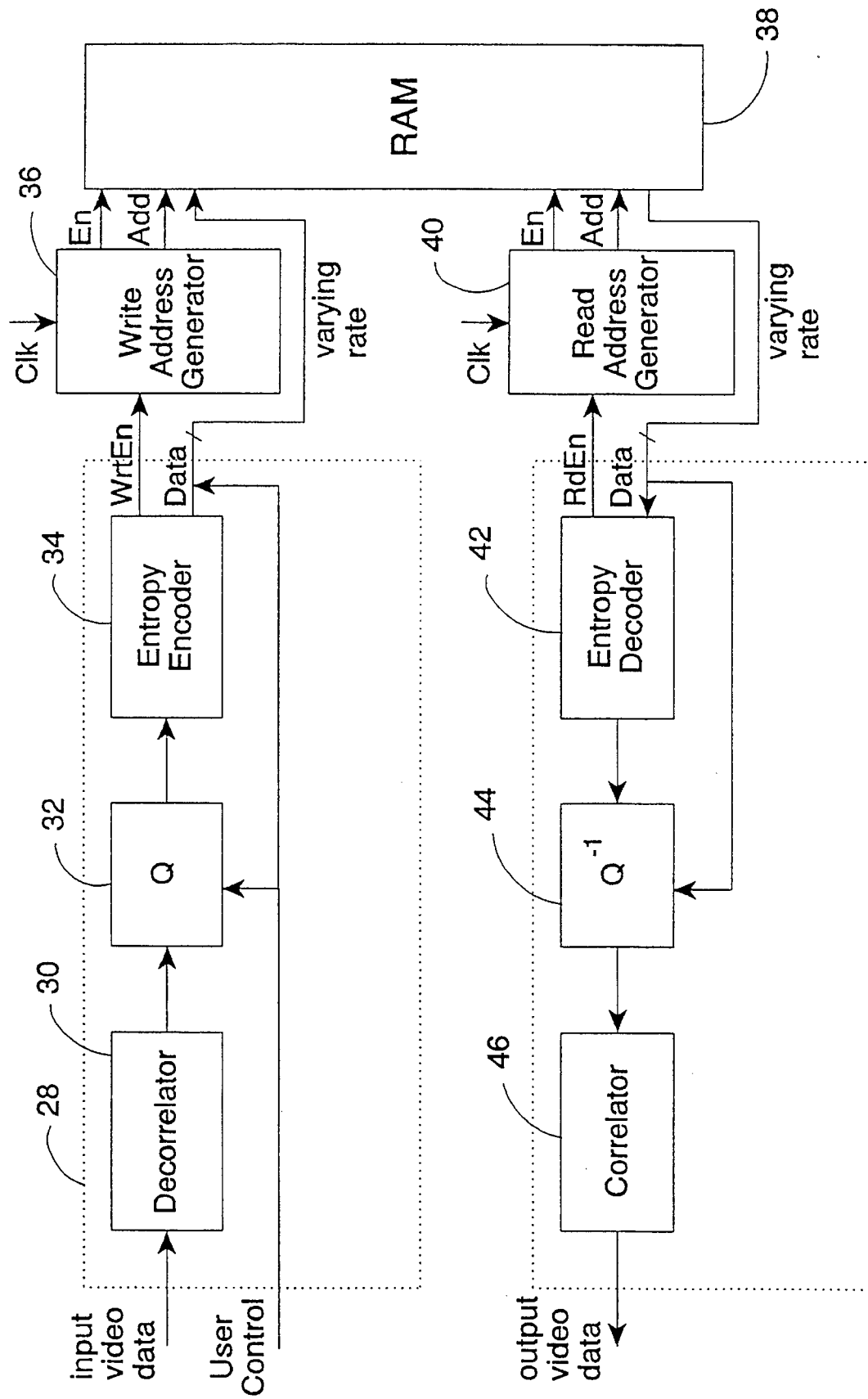
FIG. 2 illustrates a video data recording and reproducing apparatus operating with an unregulated varying compressed data rate.

FIG. 2 illustrates a video data recording and reproducing apparatus in accordance with one embodiment of the invention. Constant rate video data is input to a compressor 28. The constant rate video data first passes to a decorrelator 30 where it is transformed into the spatial frequency domain under the action of one of the known transformation techniques such as wavelet coding, sub band coding or DCT coding.

The output from the decorrelator 30 passes to a quantizer 32 where it is subject to quantization by a quantization step width that is manually controlled via a user input device (not illustrated). This quantization step width constitutes a compression control parameter that controls the amount of fidelity lost during compression. The other parts of the compression system are lossless, whereas quantization necessarily involves a loss of information from the signal. The courser the quantization step width, the greater the loss of information, but the greater the degree of compression that can be achieved.

The output from the quantizer 32 passes to an entropy encoder 34 where it is subject to runlength and Huffman coding. As each byte of data (a byte may represent whole and partial Huffman codes depending upon where the boundaries between the Huffman codes happen to fall) is assembled by the entropy encoder 34, a write enable signal is passed to a write address generator 36. The write address generator 36 under control of the write enable signal and a clock signal generate an enable signal for writing to a RAM 38 at an address that follows a predetermined sequence of addresses. The data present at the output of the entropy encoder 34 is then written into the RAM 38.

As the degree of quantization is set under manual user control, the quantization and the loss of fidelity are constant until the quantization step width is manually changed. This has the result that there is less perceivable difference in quality between images of high and low information content. Another consequence of this approach is that the data rate of the compressed data from the entropy encoder 34 varies in dependence upon whether the input video data has a high information content or a low information content.

In the case of low information content input video data, relatively few Huffman codes will be needed to represent it and the compressed data rate will fall thereby requiring less space within the RAM 38 to store a given time period of video data. Conversely, as the information content of the input video data increases, the compressed data rate also increases and more space within the RAM 38 is required.

On the decompression side of the apparatus, the data is read from the RAM 38 under control of a read address generator 40. The read address generator 40 receives a read enable signal from an entropy decoder 42 indicative of the entropy decoder being ready to receive the next byte of data for the coding. This read enable signal is then combined with a clock to produce an enable signal for the RAM 38 triggering reading of a byte of data from the RAM 38 at the address specified by the address generator 40 and incrementing of the read address along the same predetermined sequence as that used on the compression side. This byte of data is passed to the entropy decoder 42.

The entropy decoder 42 applies inverse Huffman coding and inverse runlength coding to the data and passes its output to a dequantizer 44. The dequantizer 44 receives the quantization step width to be used in the dequantization directly from within the data read from the RAM 38. This dequantization step width is that which was manually specified by the user during the compression. The output from the dequantizer 44 passes to a correlator 46.

The correlator 46 transforms the data from the spatial frequency domain to the spatial domain. The correlator 46 uses the complementary transformation to that applied by the decorrelator 30, i.e. wavelet coding, sub band coding or DCT coding. The output from the correlator 46 is constant rate output video data.

Figure 3:
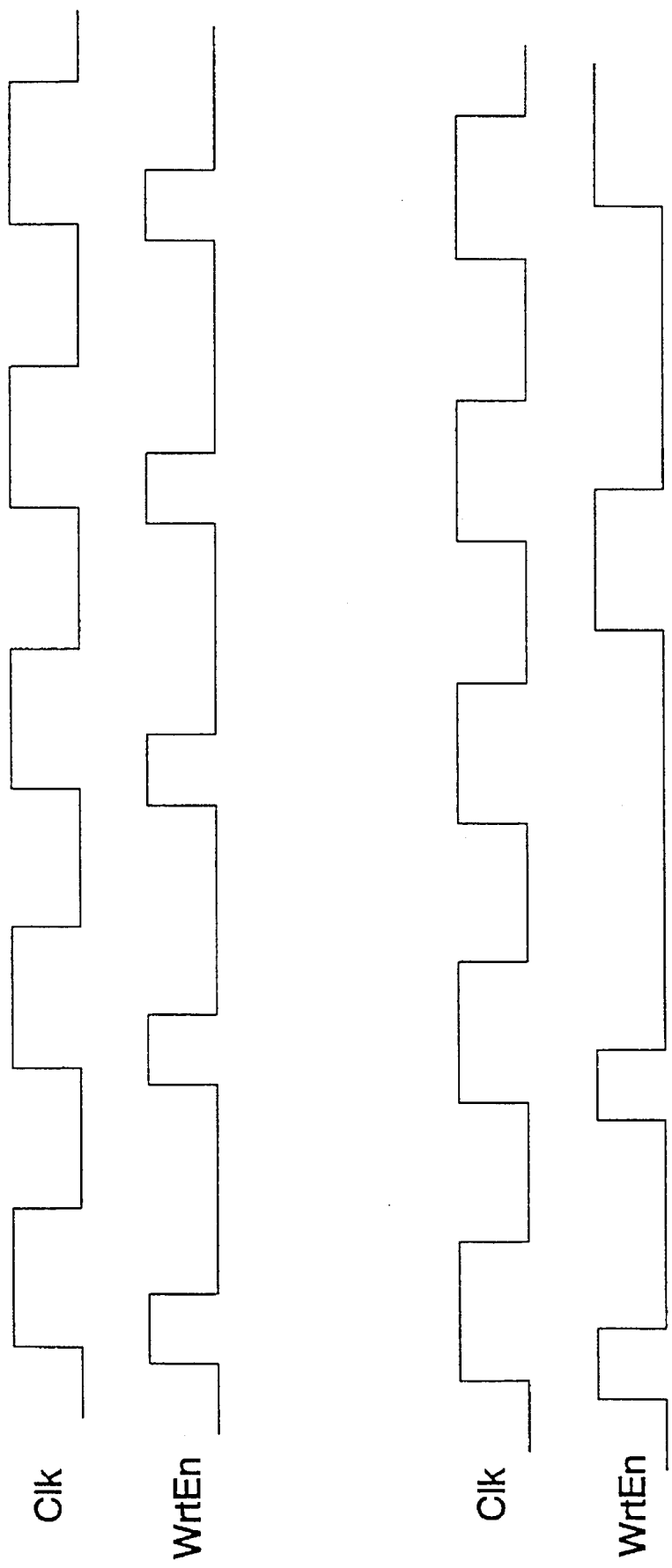
FIG. 3 illustrates differing signals within the apparatus of FIGS. 1 and 2 to assist in explaining the differences in operation.

FIG. 3 illustrates a difference between the constant rate operation of the system of FIG. 1 and the varying rate operation of the system of FIG. 2. At the top of FIG. 3 there are illustrated a storage clock signal and a write enable signal for the constant rate system of FIG. 1. The RAM 38 is driven such that a byte is written into the RAM 38 when the leading edge of the clock signal Clk coincides with a high value of the write enable signal WrtEn. The constant rate output of the entropy encoder 10 is Such that a byte is written to the RAM 38 on every clock cycle.

In contrast, the signals illustrated in the bottom part of FIG. 3 are from the varying rate system of FIG. 2. In this case, the writing of a byte of data to the RAM 38 again occurs when a leading edge of the clock signal Clk coincides with a high value of the write enable signal WPtEn. However, since the output of the entropy encoder 34 is at an unregulated and varying rate, a byte is not necessarily written to the RAM 38 upon every clock cycle. In general some clock cycles are missed which corresponds to the generally mope efficient use of the RAM 38 whereby video data of relatively little information content need not necessarily be evaluated to occupy the same RAM capacity as video data of high information content.

It will be appreciated that whilst the present embodiment has illustrated the use of decorrelation, quantization, and entropy encoding as the compression technique, the invention is equally applicable to other compression techniques. Furthermore, the user adjustable compression control parameter of the quantization step width may be substituted by another control parameter within another system.

The function of the compression control parameter is that it allows the user to set a particular loss of fidelity with which they wish to operate and then the compressed data date is allowed to vary depending upon the input video data information content whilst maintaining this loss of fidelity constant. It will also be appreciated that different sorts or, storage other than RAM may be used providing that they are able to handle variable rate writing and reading.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for real time recording of uncompressed video data having a constant uncompressed data rate, said apparatus comprising:

compressing means for compressing said uncompressed video data and responsive to a compression control parameter for varying said constant uncompressed data rate to form compressed video data having unregulated varying compressed data rates, said compression control parameter being varied to maintain a constant level of picture quality during compression of said uncompressed video data;

adjusting means for adjusting said compression control parameter in response to a user input whereby the user may balance the picture quality against a recording capacity requirement of said uncompressed video data on a recording medium; and storing means for storing said compressed video data on said recording medium at said varying compressed data rates.

2. The apparatus of claim 1, wherein said storing means comprises a magnetic disc storage medium.

3. The apparatus of claim 1, wherein said storing means comprises a random access memory.

4. The apparatus of claim 3, further comprising a write controller for generating an periodic write control signal for triggering storage of a byte of compressed video data in said random access memory when said compressing means outputs said byte and for incrementing a write address of said random access memory along a predetermined sequence.

5. The apparatus of claim 14, wherein said compressing means comprises a quantizer and said compression control parameter is quantization step width.

6. The apparatus of claim 14, wherein said compressing means comprises a frequency separator for transforming said uncompressed video data into a spatial frequency domain.

7. The apparatus of claim 14, wherein said compressing means comprises an entropy encoder.

8. Apparatus for real time recording and reproducing of uncompressed video data having a constant uncompressed data rate, said apparatus comprising:

compressing means for compressing said uncompressed video data and responsive to a compression control parameter for varying said constant uncompressed data rate to form compressed video data having unregulated varying compressed data rates, said compression control parameter being varied to maintain a constant level of picture quality during compression of said uncompressed video data;

adjusting means for adjusting said compression control parameter in response to a user input whereby the user may balance the picture quality against a recording capacity requirement of said uncompressed video data on a recording medium;

storing means for storing said compressed video data and said compression control parameter on said recording medium at said varying compressed data rates;

reading means for reading said compressed video data and said compression control parameter from said storing means at said varying compressed data rates; and decompressing means responsive to the read compression control parameter for decompressing said compressed video data and modifying said varying compressed data rates to form said uncompressed video data having said constant uncompressed data rate.

9. The apparatus of claim 8, wherein said recording medium is a random access memory.

10. The apparatus of claim 8, wherein said recording medium is a magnetic disc storage medium.

11. The apparatus of claim 9, comprising a write controller for generating an periodic write control signal for triggering storage of a byte of compressed video data in said random access memory when said compressing means outputs said byte and for incrementing a write address of said random access memory along a predetermined sequence and a read controller for generating an periodic read control signal for triggering reading of a byte of compressed video data from said random access memory when said decompressing means is ready for a next byte of compressed video data and for incrementing a read address of said random access memory along said predetermined sequence.

12. The apparatus of claim 3, wherein said compressing means comprises a quantizer, said compression control parameter is quantization step width and said decompressing means comprises a dequantizer.

13. The apparatus of claim 8, wherein said compressing means comprises a frequency separator for transforming said uncompressed video data into a spatial frequency domain and said decompressing means comprises a frequency combiner for transforming said compressed video data from said spatial frequency domain to a spatial domain.

14. The apparatus of claim 8, wherein said compressing means comprises an entropy encoder and said decompressing means comprises an entropy decoder.

15. Method for real time recording of uncompressed video data having a constant uncompressed data rate comprising the steps of:

compressing said uncompressed video data and varying said constant uncompressed data rate in response to a compression control parameter to form compressed video data having unregulated varying compressed data rates, said compression control parameter being varied to maintain a constant level of picture quality during compression of said uncompressed video data;

adjusting said compression control parameter in response to a user input, whereby the user may balance a loss in picture quality against a recording capacity requirement of said uncompressed video data on a recording medium; and storing said compressed video data on said recording medium at said varying compressed data rates.

16. Method for real time recording and reproducing of uncompressed video data having a constant uncompressed data rate, comprising the steps of:

compressing said uncompressed video data and varying said constant uncompressed data rate in response to a compression control parameter to form compressed video data having unregulated varying compressed data rates, said compression control parameter being varied to maintain a constant level of picture quality during compression of said uncompressed video data;

adjusting said compression control parameter in response to a user input whereby the user may balance the picture quality against a recording capacity requirement of said uncompressed video data on a recording medium;

storing said compressed video data and said compression control parameter on said recording medium at said varying compressed data rates;

reading said compressed video data and said compression control parameter from said storing means at said varying compressed data rates; and decompressing said compressed video data in response to the read compression control parameter and modifying said varying compressed data rates to form said uncompressed video data having said constant uncompressed data rate.

\* \* \* \* \*